(12) United States Patent
Saikawa et al.

(10) Patent No.: US 7,173,785 B2
(45) Date of Patent: Feb. 6, 2007

(54) DATA STORAGE DEVICE AND SERVO INFORMATION WRITING METHOD

(75) Inventors: Manabu Saikawa, Fujisawa (JP); Hirofumi Yanase, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 366 days.

(21) Appl. No.: 10/601,266

(22) Filed: Jun. 19, 2003

(65) Prior Publication Data
US 2004/0057151 A1  Mar. 25, 2004

(30) Foreign Application Priority Data
Jun. 25, 2002  (JP) .............................. 2002-185285

(51) Int. Cl.
*G11B 5/09* (2006.01)
*G11B 5/00* (2006.01)
*G11B 20/20* (2006.01)

(52) U.S. Cl. .............................. 360/48; 360/46; 360/76

(58) Field of Classification Search .................. 360/48, 360/75, 77.08, 78.14, 77.04, 78.09
See application file for complete search history.

(56) References Cited

U.S. PATENT DOCUMENTS

| | | | | |
|---|---|---|---|---|
| 6,597,530 B2 * | 7/2003 | Asano et al. | ............ | 360/78.14 |
| 6,700,731 B2 * | 3/2004 | Chew | ...................... | 360/77.08 |
| 2002/0036859 A1 * | 3/2002 | Liu et al. | ...................... | 360/75 |
| 2002/0176199 A1 * | 11/2002 | Gomez et al. | ................ | 360/75 |

FOREIGN PATENT DOCUMENTS

JP        2000322848      11/2000

* cited by examiner

*Primary Examiner*—Wayne Young
*Assistant Examiner*—Daniell L. Negrón
(74) *Attorney, Agent, or Firm*—Patrick Duncan

(57) ABSTRACT

Provided is a data storage device in which read and write heads can be desirably located with respect to servo tracks from the viewpoint of linearity of a PES on the premise that a read write offset exists. A read write offset value, which is a deviation amount between write and read heads in a radial direction of a disk-shaped storage medium, is set equivalent to an integer number N of servo tracks.

15 Claims, 9 Drawing Sheets

(a)

(b)

(c)

DATA STORAGE DEVICE AND SERVO INFORMATION WRITING METHOD

BACKGROUND OF THE INVENTION

The present invention relates to a data storage device including a recording medium on which servo information for positioning a read/write head is written, and more specifically to a data storage device having characteristic servo information written thereto.

A hard disk drive has a magnetic head for reading user data stored on a magnetic disk and for writing user data on the magnetic disk. The magnetic head is attached to a rotary-type actuator mechanism which is swung by a voice coil motor (VCM).

When the magnetic head writes or reads user data, the actuator mechanism is driven, and thus the magnetic head is moved to a predetermined track and positioned. Movement of the magnetic head to a predetermined position is controlled by using servo information stored on the magnetic disk as a clue.

On a magnetic disk contained in a hard disk drive or the like, a plurality of data tracks are concentrically formed and, moreover, identification information and burst patterns are stored along radial directions of the disk in advance. The identification information and the burst patterns constitute servo information. The identification information is information indicating track addresses of respective data tracks. Based on the identification information read by a magnetic head, determination can be made as to an approximate position of the magnetic head, that is, as to which data track a position of the magnetic head corresponds to. The burst patterns are constituted by a plurality of burst pattern rows in which areas having signals stored therein are arranged along the radial directions of the disk at constant intervals and of which signal storage areas have mutually different phases. It is possible to detect a precise position of the magnetic head, that is, a deviation indicating how far the position of the magnetic head deviates from the data track to which the magnetic head corresponds, based on a signal (position error signal: PES) outputted from the magnetic head in accordance with the burst pattern.

A read or write of user data with respect to the magnetic disk is performed in a state where the magnetic disk is rotating after the following operations: the magnetic head is moved while an approximate position of the magnetic disk is being determined based on the identification information read by the magnetic head, whereby the magnetic head is made to correspond to a specific data track; and then the magnetic head is precisely positioned at the specific data track based on a signal outputted from the magnetic head in accordance with the burst patterns. Such a series of operations are referred to as a seek operation. Even in a period when user data is being read or written, feedback control is performed so that the magnetic head is positioned at a fixed position relative to the specific data track based on the signal outputted from the magnetic head in accordance with the burst patterns. Such an operation is referred to as a track following operation.

Servo information is written on a magnetic disk as a recording medium in a manufacturing process before a hard disk drive is shipped as a product. It is required that the servo information be written precisely in order to write or read user data accurately.

In a hard disk drive, as a recording density increases, a magnetoresistance (MR) head or giant magnetoresistance (GMR) head using the magnetoresistance effect is used as a reproducing head (read head), and an inductive head is used as a recording head (write head). The two heads are attached to a same magnetic head slider and constitute a hybrid magnetic head.

As described above, one existing hard disk drive uses a rotary-type actuator as an actuator for driving a magnetic head. Therefore, when the magnetic head accesses a predetermined position on a magnetic disk, a trajectory of the magnetic head forms a circular arc. Accordingly, over the range of the most inner track to the most outer track of the magnetic disk, the center line of a magnetic head slider and a tangent line of a data track on the magnetic disk are not parallel but intersect with a different angle depending on each data track. The intersecting angle is referred to as a skew angle.

The existence of the skew angle inevitably generates a read write offset described later. Specifically, when a read head is positioned at a proper position on a servo track of the magnetic disk (such a state is referred to as "on track"), a write head cannot be positioned at a proper position on the servo track (such a state is referred to as "off track"). The position difference between the centers of the read and write heads is a read write offset.

In a hard disk drive, when user data is written on a magnetic disk (recording), a magnetic head slider is moved to a target position by reading servo information recorded on a servo track by use of a read head, the read head is made to be "on track" on a servo track, and then the user data is written on a data track of the magnetic disk by a write head. On the other hand, when the user data written on the data track is reproduced, even if the read head is made to be "on track" on the servo track, the read head cannot be "on track" on the data track to which the write head has written the user data, due to a read write offset. Accordingly, the user data may not be accurately reproduced sometimes.

Various proposals have been made for solving the above-described problem based on a read write offset. Japanese Unexamined Patent Publication No. 2000-322848, for example, discloses a method in which a measured read write offset value is stored, and an access position is corrected based on the stored read write offset value when user data is reproduced, thus performing positioning control of a magnetic head slider.

The above-described proposal is an effective method for a read write offset but has the following problems.

FIG. 13 is a view showing a relationship between burst patterns BP and a PES. Ideally, it is preferred that the PES is shown by continuous linear lines. However, in reality, the linearity is lost in regions indicated by circles and surrounding regions thereof. Therefore, an error appears in a physical position obtained by conversion based on the PES. Moreover, the loss of the linearity adversely influences a servo control system. In a hard disk drive used heretofore, servo tracks are recorded at a constant track pitch on a magnetic disk. Accordingly, any one of read and write heads is located at a position where linearity of a PES is lost.

SUMMARY OF THE INVENTION

The present invention has an object to provide a data storage device in which read and write heads can be located at a desired position of servo tracks from the viewpoint of linearity of a PES with the assumption that a read write offset exists. Another object of the present invention is to provide a servo information writing method for obtaining such a data storage device.

The present invention proposes a method in which a pitch of servo tracks is not set constant as heretofore, but in which the servo tracks are divided into zones and the pitch of the servo tracks is varied within each zone, thereby setting a read write offset value to a value equivalent to an integer number N of the servo tracks. Thus, both write and read heads can be positioned at positions where linearity of a PES is maintained.

The present invention is based on the above-described knowledge and is a data storage device including: a disk-shaped storage medium which has a data storage area and a servo area; a hybrid head slider which supports write and read heads; and a rotary-type actuator which swings the hybrid head slider to position any one of the write and read heads at a target track of the disk-shaped storage medium. The data storage area contains a plurality of data tracks which store user information, and the servo area contains a plurality of servo tracks which store servo information for identifying positions of the plurality of data tracks. The write head writes user data on the data tracks of the disk-shaped storage medium, and the read head reads the user data written on the data tracks. In the data storage device, a read write offset value is set equivalent to an integer number N of the servo tracks. Here, the read write offset value is a deviation amount between the write and read heads in a radial direction of the disk-shaped storage medium, and the deviation amount is caused by swinging of the hybrid head slider by the rotary-type actuator.

In the data storage device of the present invention, the read write offset value can be set equivalent to an integer number N of the servo tracks by varying a pitch of the plurality of servo tracks in the radial direction of the disk-shaped storage medium. In this case, a predetermined number of the servo tracks are regarded as a zone, and the integer number N can be varied within each zone. Moreover, the integer number N can be increased stepwise from an inner diameter toward an outer diameter of the disk-shaped storage medium.

According to the data storage device of the present invention constituted as described above, the write and read heads can be positioned within a region where an error signal obtained from the servo information is linear, which is preferable for servo control.

Note that the present invention is effective when it is applied to a data storage device in which write and read heads are supported by a hybrid head slider at a predetermined center distance from each other in a radial direction of a disk-shaped storage medium.

In the hard disk drive used heretofore, a pitch of servo tracks is constant, whereas, in the data storage device of the present invention, the pitch of the servo tracks is deliberately made nonconstant, thereby making it possible to set the read write offset value to a value equivalent to an integer number N of the servo tracks. Therefore, the present invention provides a data storage device including: a disk-shaped storage medium which has a data storage area and a servo area, the data storage area containing a plurality of data tracks which store user information, the servo area containing a plurality of servo tracks which store servo information for identifying positions of the plurality of data tracks; a hybrid head slider which supports write and read heads, the write head writing user data on the data tracks of the disk-shaped storage medium, the read head reading the user data written on the data tracks; and a rotary-type actuator which swings the hybrid head slider to position any one of the write and read heads at a target track of the disk-shaped storage medium, and wherein a pitch of the servo tracks varies within a predetermined region in a radial direction of the disk-shaped storage medium.

In the data storage device of the present invention, the pitch of the servo tracks is preferably varied with a standard pitch centered within the predetermined region in the radial direction of the disk-shaped storage medium. In this case, a variation ratio of the pitch of the servo tracks is preferably inverted from plus to minus at a position which has the standard pitch and which is measured along the radial direction of the disk-shaped storage medium as a boundary.

The present invention also provide a servo information writing method for writing a burst pattern as servo information on a disk-shaped storage medium of a data storage device which has a hybrid head including write and read heads. In the writing method, first, a read write offset value is measured within a predetermined range on the disk-shaped storage medium, where the read write offset value is a deviation amount between the write and read heads in a radial direction of the disk-shaped storage medium. Next, the burst pattern is written so that the measured read write offset value is equivalent to an integer number N of servo tracks formed by the burst pattern.

In the servo information writing method of the present invention, the burst pattern is preferably written so that a pitch of the servo tracks varies at a predetermined variation ratio in the radial direction of the disk-shaped storage medium. Moreover, the pitch of the servo tracks is preferably varied in relation to a predetermined pitch set as a standard.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

Hereinafter, the present invention will be described based on an embodiment.

Figure 1:
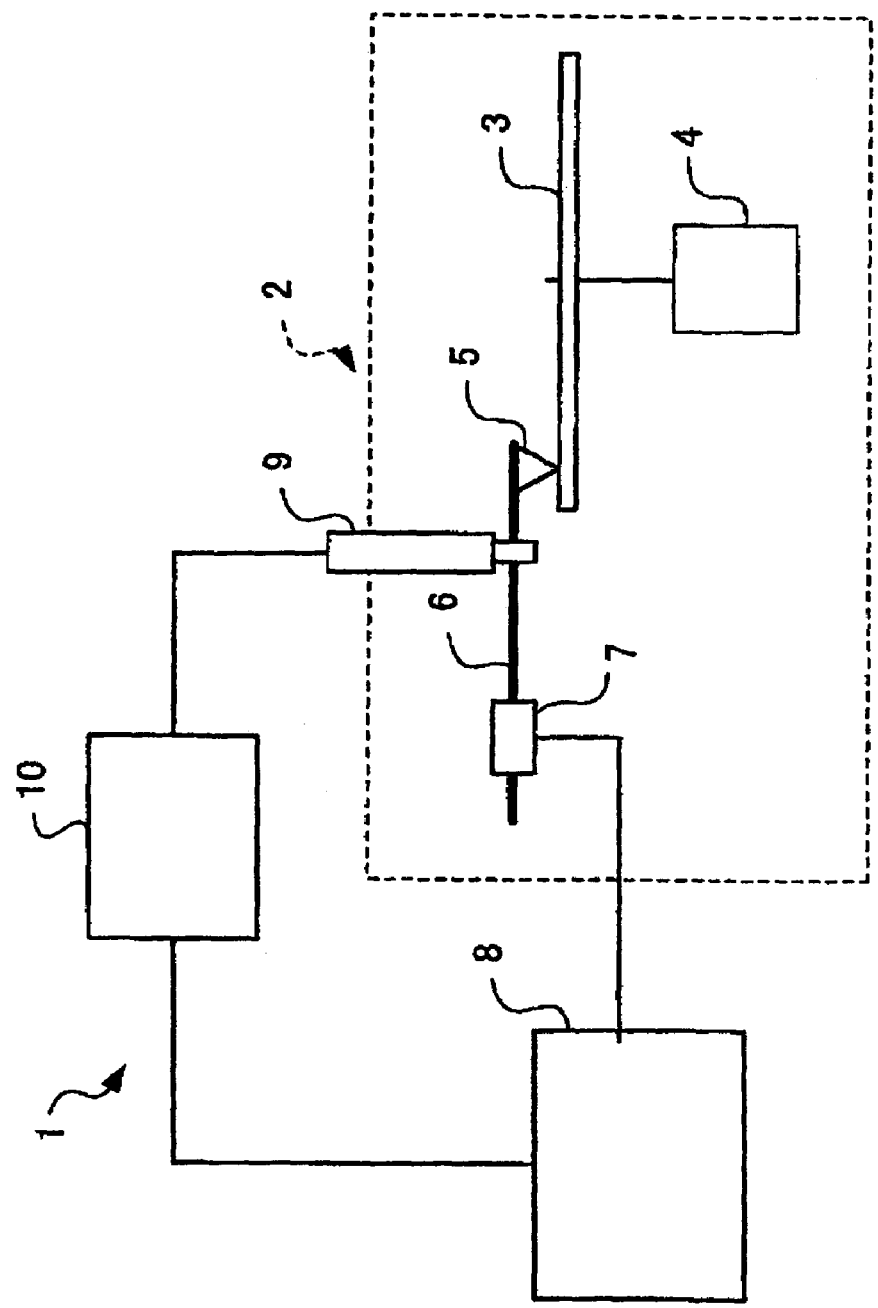
FIG. 1 is a block diagram showing a configuration of a servo track writer according to an embodiment.

FIG. 1 is a view schematically showing a hard disk drive 2 according to the embodiment and a servo track writer 1 for performing a write of servo information to the hard disk drive 2.

The servo track writer 1 is a device which has a recording controller 8, a head positioner 9, and a positioner controller 10, and which writes servo information on a magnetic disk 3 constituting the hard disk drive 2.

The hard disk drive 2 has a magnetic disk 3 on which user data is to be written, a spindle motor 4 for driving rotation of the magnetic disk 3, a magnetic head slider 5 which supports a write head for writing user data on the magnetic disk 3 and a read head for reading user data written on the magnetic disk 3, an arm 6 for supporting the magnetic head slider 5, and a voice coil motor 7 for swinging the arm 6. When user data is written to or read from the magnetic disk 3 in the hard disk drive 2, the magnetic head slider 5 is swung over the magnetic disk 3 by the voice coil motor 7. Note that the hard disk drive 2 may have a plurality of magnetic disks 3 but only one magnetic disk 3 is shown in FIG. 1. The servo track writer 1 writes servo information on the magnetic disk 3 by using the magnetic head slider 5 of the hard disk drive 2.

A plurality of tracks are concentrically formed on the magnetic disk 3. The tracks are each divided into a plurality of sectors in which servo sectors and data sectors are paired. A servo sector is an area on which servo information for identifying a position on the tracks is stored. The servo information is written by the write head supported by the magnetic head slider 5. A write of servo information will be described later.

Figure 2:
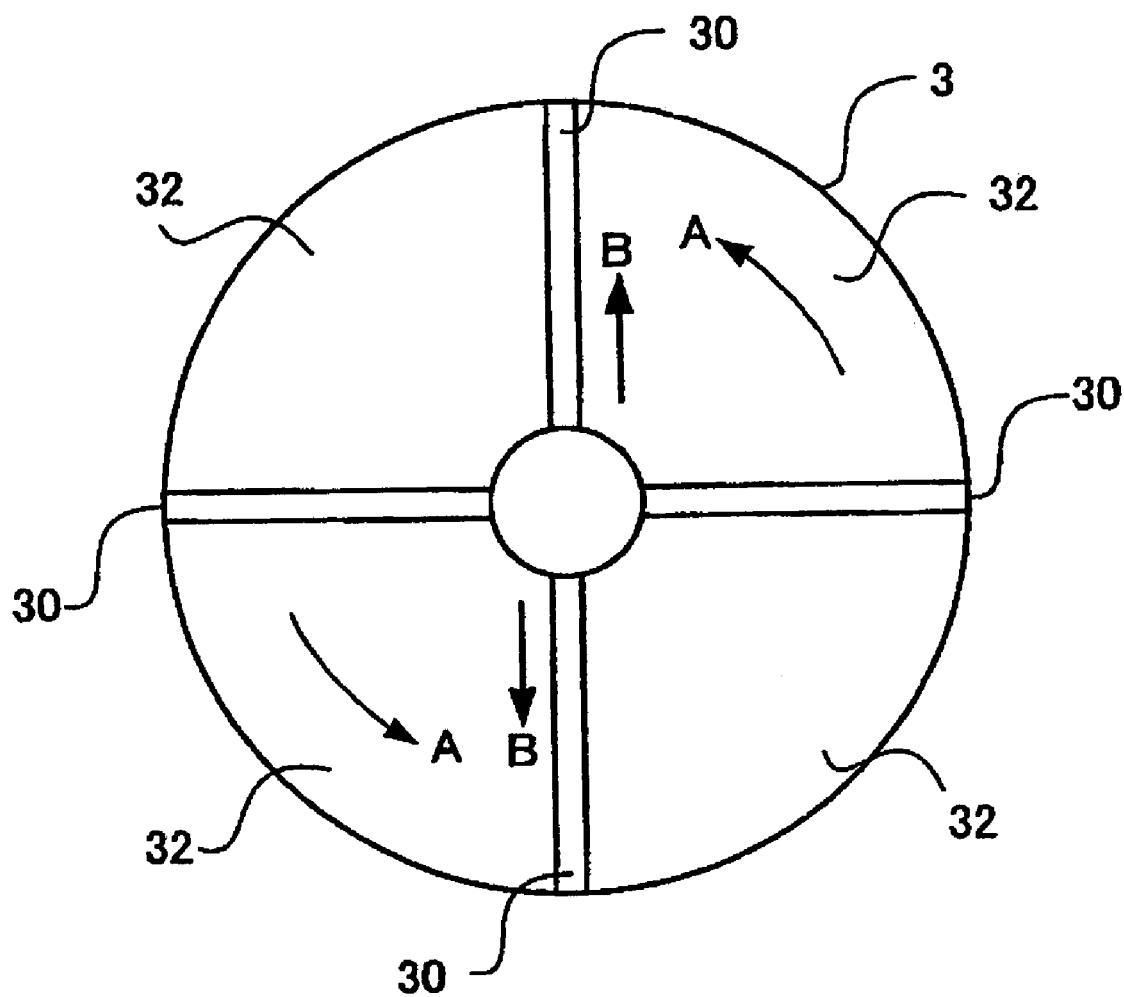
FIG. 2 is a view schematically showing stored contents of a magnetic disk according to the embodiment.
Figure 3:
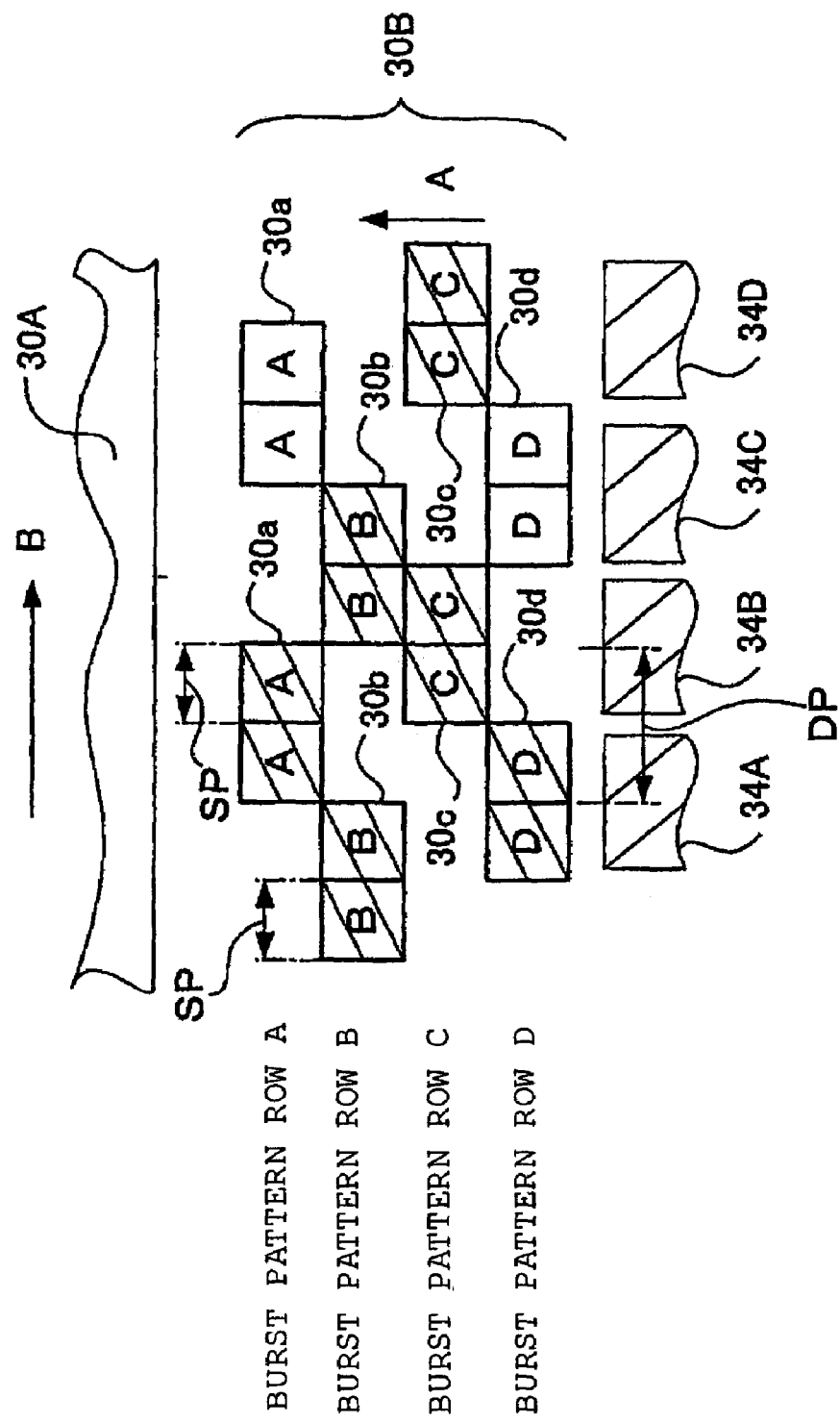
FIG. 3 is another view schematically showing the stored contents of the magnetic disk according to the embodiment.

When the hard disk drive 2 is operating, the rotation of the magnetic disk 3 is driven around a spindle shaft of the spindle motor 4. On the other hand, when the hard disk drive 2 is not operating, the rotation of the magnetic disk 3 is stopped (stationary). On each recording surface of the magnetic disk 3, a plurality of servo track areas 30 are radially formed along radial directions (directions of Arrows B in FIG. 2) of the magnetic disk 3 as shown in FIG. 2, and other areas are set to be data track areas 32. Part of the servo track areas 30 and the data track areas 32 are shown in FIG. 3. In the data track areas 32, a plurality of data tracks are concentrically formed at a predetermined pitch. Data tracks 34A, 34B, 34C, and 34D, which are part of the plurality of data tracks, are shown in FIG. 3. Read and write of user data are performed with respect to the data tracks 34 along a circumferential direction (direction of Arrow A in FIGS. 2 and 3) of the magnetic disk 3 by the magnetic head slider 5 described later.

On the other hand, in the servo track areas 30, track identification information storage areas 30A and burst pattern storage areas 30B are provided. In the track identification information storage areas 30A, track identification information in which a track address of each data track 34 is represented by a gray code (cyclic binary code) is stored corresponding to each data track 34. In the burst pattern storage areas 30B, burst patterns are formed. As shown in FIG. 3, the burst patterns are constituted by four burst pattern rows (burst pattern rows A to D). In each burst pattern row, areas each having a signal stored therein (portions indicated by hatching in FIG. 3) are arranged along an arranging direction of the data tracks 34, that is, the radial direction (direction of Arrow B in FIG. 3) of the magnetic disk 3. Each signal storage area constituting each burst pattern row has a length along the radial direction of the magnetic disk 3 and a distance from the signal storage area adjacent thereto which are each equal to a pitch DP of the data tracks 34 in length. Moreover, as shown in FIG. 3, a width of a single burst pattern constitutes a pitch SP of a single servo track.

When the magnetic head slider 5 is used as part of the hard disk drive 2 as described above, it performs a write or read of user data with respect to the magnetic disk 3. Meanwhile, when the magnetic head slider 5 functions as part of the servo track writer 1, it writes servo information on a servo track.

When servo information is written on a predetermined servo track, the head positioner 9 guides the magnetic head slider 5. Moreover, the head positioner 9 also has a positioning function for stopping the magnetic head slider 5 at a predetermined position after guiding the magnetic head slider 5 to the relevant position. The head positioner 9 drives the magnetic head slider 5 based on instructions from the positioner controller 10.

The recording controller 8 controls a write of servo information performed by the magnetic head slider 5. Moreover, the recording controller 8 instructs the positioner controller 10 to drive the head positioner 9. The positioner controller 10 controls operations of the head positioner 9 based on the instructions.

Next, a write of servo information to the magnetic disk 3 will be described. Note that the write processing of servo information is performed by the recording controller 8, the head positioner 9, the positioner controller 10, and the write head, which is supported by the magnetic head slider 5.

Figure 4:
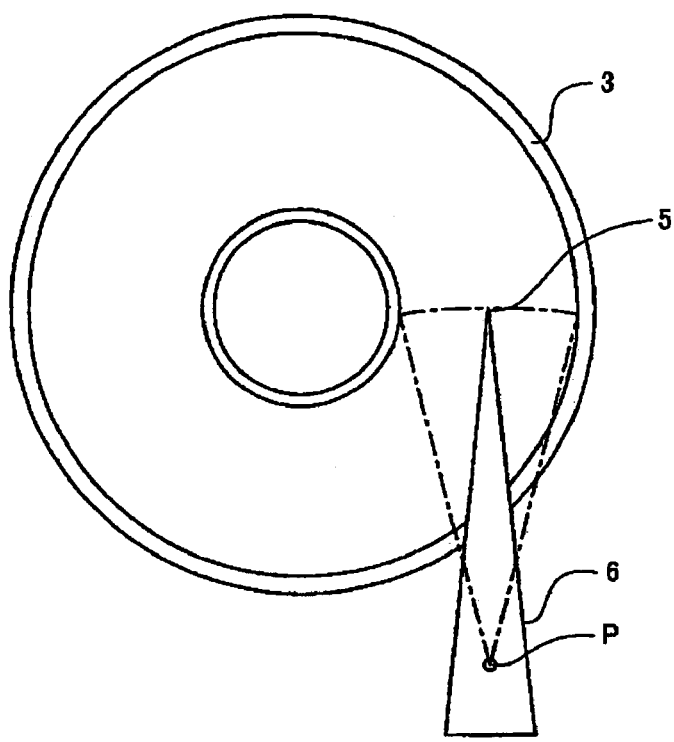
FIG. 4 is a view showing a state of a magnetic head slider swinging over the magnetic disk.

As shown in FIG. 4, the arm 6 holding the magnetic head slider 5 moves circularly about a pivot center PV by the voice coil motor 7. A positional relationship among the magnetic disk 3, the arm 6, and the voice coil motor 7 is fixed so that a skew angle becomes zero when the magnetic head slider 5 is at the center in the radial direction of the magnetic disk 3, for example.

Figure 5:
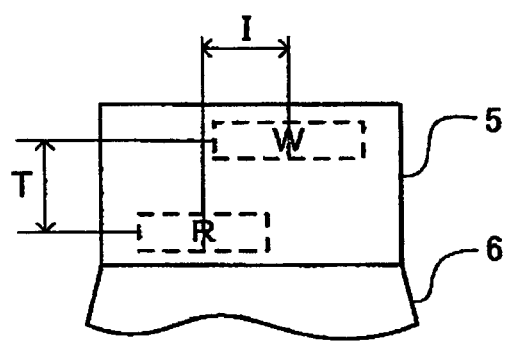
FIGS. 5A to 5C are views showing arrangements of write and read heads W and R in the magnetic head slider.
Figure 5:
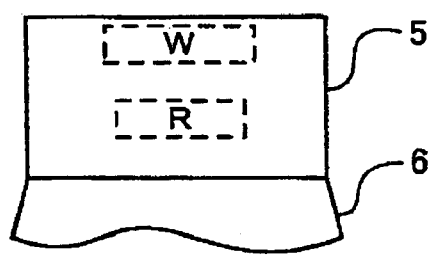
Figure 5:
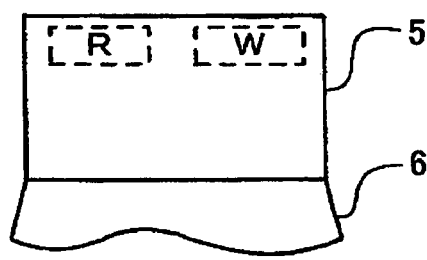

FIGS. 5A to 5C show arrangements of the write and read heads W and R in the magnetic head slider 5. Note that FIGS. 5A to 5C are plan views in which the magnetic head slider 5 is viewed from the top surface thereof. In the magnetic head slider 5 in FIG. 5A, the write and read heads W and R are located at a predetermined center distance from each other in the radial direction of the magnetic disk 3. In addition, the write and read heads W and R are arranged so as to be away from each other by a distance T in the longitudinal direction of the arm 6 and a distance I in the transverse direction of the arm 6. Hereinafter, description will proceed using the magnetic head slider 5 shown in FIG. 5A as an example.

Figure 6:
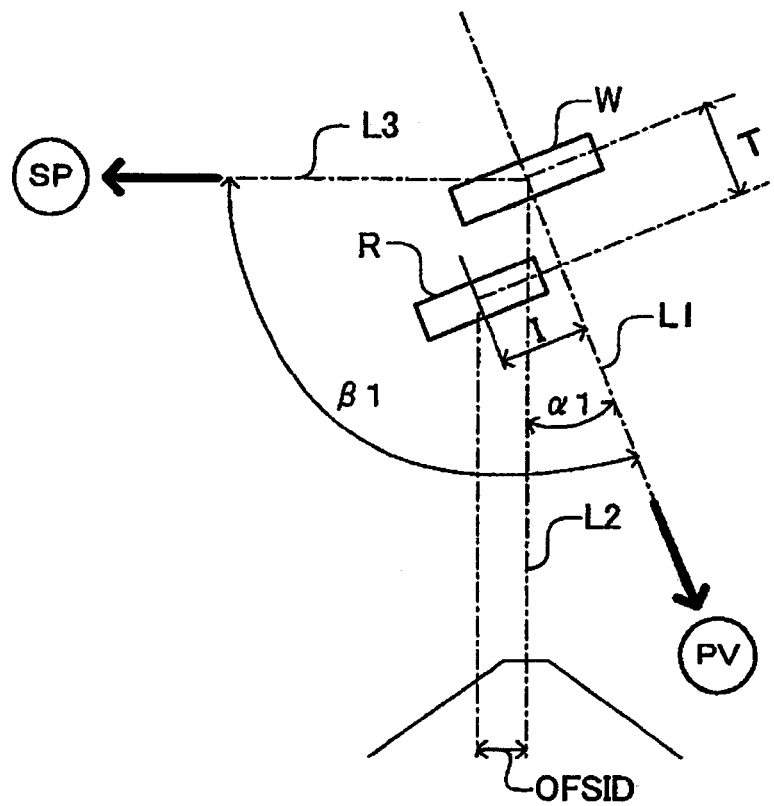
FIG. 6 is a view schematically showing a state of the magnetic head slider positioned at the most inner track (ID) of the magnetic disk.
Figure 7:
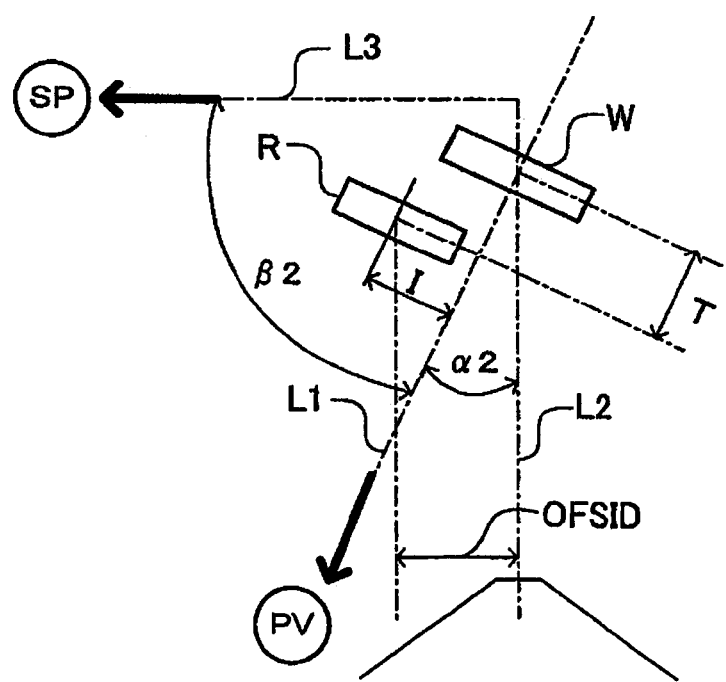
FIG. 7 is a view schematically showing a state of the magnetic head slider positioned at the most outer track (OD) of the magnetic disk.

FIG. 6 schematically shows the state where the magnetic head slider 5 is positioned at the most inner track (ID) of the magnetic disk 3, and FIG. 7 schematically shows the state where the magnetic head slider 5 is positioned at the most outer track (OD) of the magnetic disk 3. In FIG. 6, [alpha]1 denotes the angle between the segment L1 which connects the center of the write head W in the width direction thereof and the pivot center PV and the tangent line L2 which touches the track located on ID at the center of the write head W. Moreover, in FIG. 6, [beta]1 denotes the angle between the segment L1 connecting the center of the write head W in the width direction thereof and the pivot center PV and the segment L3 connecting the center of the write head W and the rotation center of the magnetic disk 3. On the other hand, in FIG. 7, [alpha]2 denotes the angle between the segment L1 which connects the center of the write head W in the width direction thereof and the pivot center PV and the tangent line L2 which touches the track located on OD at the center of the write head W. Furthermore, in FIG. 7, [beta]2 denotes the angle between the segment L1 connecting the center of the write head W in the width direction thereof and the pivot center PV and the segment L3 connecting the center of the write head W and the rotation center of the magnetic disk 3.

Figure 8:
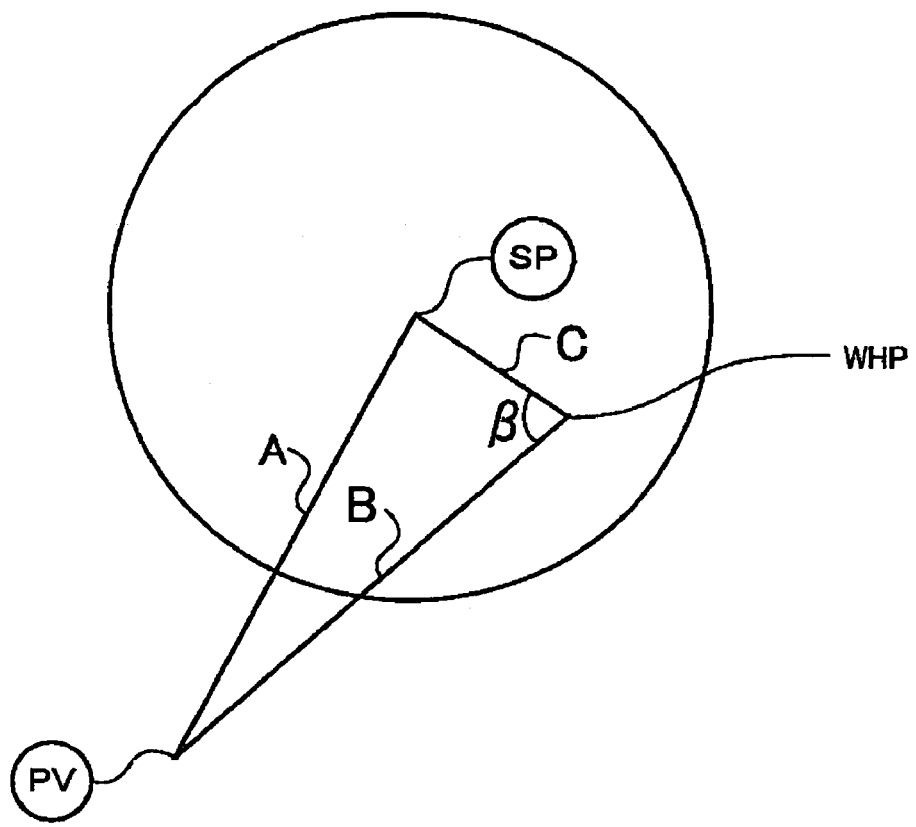
FIG. 8 is a view schematically showing a positional relationship among a position of the write head, a rotation center (SP) of the magnetic disk, and a pivot center (PV).

FIG. 8 is a view schematically showing an arrangement relationship among the position WHP of the write head W, the rotation center SP of the magnetic disk 3, and the pivot center PV. Note that, as shown in FIG. 8, A denotes the segment connecting the pivot center PV and the rotation center SP of the magnetic disk 3, B denotes the segment connecting the pivot center (PV) and the position (WHP) of the write head W, and C denotes the segment connecting the rotation center (SP) and the position (WHP) of the write head W. The segment C identifies the distance from the center of the magnetic disk 3 to the write head W in the radial direction of the magnetic disk 3 (hereinafter, such a distance is referred to as a position in the radial direction).

Based on FIGS. 6 and 7, a read write offset value when the magnetic head slider 5 is positioned at ID (hereinafter, such a read write offset value is sometimes abbreviated to OFSID) and a read write offset value when the magnetic head slider 5 is positioned at OD (hereinafter, such a read write offset value is sometimes abbreviated to OFSOD) can be respectively found from Equations 1 and 2 shown below.

$$OFSID = T\sin(\alpha 1) + I\cos(\alpha 1) \qquad \text{Equation 1}$$

$$OFSOD = T\sin(-\alpha 2) + I\cos(-\alpha 2) \qquad \text{Equation 2}$$

Moreover, in FIG. 8, the angle [beta] can be found from Equation 3 shown below by using the cosine theorem. Furthermore, based on FIGS. 6 and 7, the relationship between [alpha] and [beta] can be expressed by Equation 4 shown below. Therefore, the angle [alpha] for a position in the radial direction of the magnetic disk 3 can be found.

$$\beta = \arccos\{(B^2 + C^2 - A^2)/2BC\} \qquad \text{Equation 3}$$

$$\beta - \pi/2 = \alpha \qquad \text{Equation 4}$$

Here, when the number of the magnetic head sliders 5 is more than one, T and I in FIG. 5A are variables which vary depending on the respective magnetic head sliders 5. Accordingly, if the read write offset value is measured at ID and OD, then simultaneous equations including Equations 1 and 2 are solved to obtain T and I specific to each magnetic head slider 5.

Moreover, based on Equations 3 and 4, C can be found from Equation 5 below. Furthermore, based on Equation 1, [alpha] can be found from Equation 6 below.

[Equation 1]

$$C = \frac{1}{2}\left(2B\cos\left[a + \frac{\pi}{2}\right] + \sqrt{\left(2B\cos\left[a + \frac{\pi}{2}\right]\right)^2 - 4(B^2 - A^2)}\right) \qquad \text{Equation 5}$$

[Equation 2]

$$a = \arcsin\left[\frac{1}{T^2 + I^2}\left(RWOFS \times T - I\sqrt{T^2 - I^2 - RWOFS^2}\right)\right] \qquad \text{Equation 6}$$

The position C can be found from Equations 5 and 6 by using T and I obtained above and applying the read write offset value (hereinafter, sometimes abbreviated to RWOFS) to Equations 5 and 6. Note that C=f(RWOFS) is described as C(RWOFS).

Figure 9:
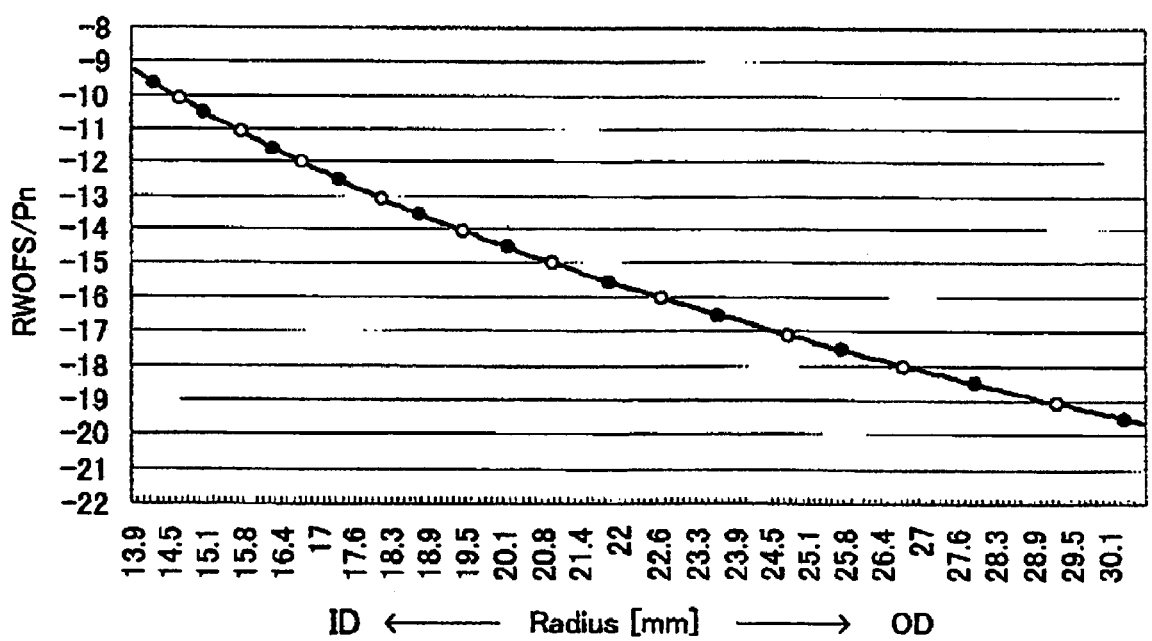
FIG. 9 is a graph showing a relationship between a position in a radial direction of the magnetic disk and a value obtained by dividing a read write offset value by a standard servo track pitch Pn in a hard disk drive according to the embodiment.

A standard servo track pitch is now denoted by Pn. All the positions C were obtained when RWOFS is N times Pn (N is an integer number) and N times Pn+/−0.5. The result is shown in FIG. 9. FIG. 9 is a graph with the position C (Radius: mm) in the radial direction of the magnetic disk 3 on the horizontal axis, and with the value obtained by dividing RWOFS by the standard servo track pitch Pn on the vertical axis. Note that, in FIG. 9, the positions C when RWOFS is N times the standard servo track pitch Pn are represented by white circles, and the positions C when RWOFS is N times the standard servo track pitch Pn+/−0.5 are represented by black circles. Incidentally, the reason for adding the sign −(minus) to the vertical axis in FIG. 9 is because the write head W is used as a standard and the directions of OD and ID are respectively designated as plus and minus.

For the position C(Pn×n1) when N=n1, that is, when RWOFS=Pn×n1, the standard servo track pitch Pn is varied within the range of C(Pn×n1−0.5) to C(Pn×n1+0.5) in accordance with Equation 7 below.

$$P\text{new} = Pn \times (Pn \times n1/(Pn \times n1 + a)) \qquad \text{Equation 7}$$

Here, a is +/−0.5.

Figure 10:
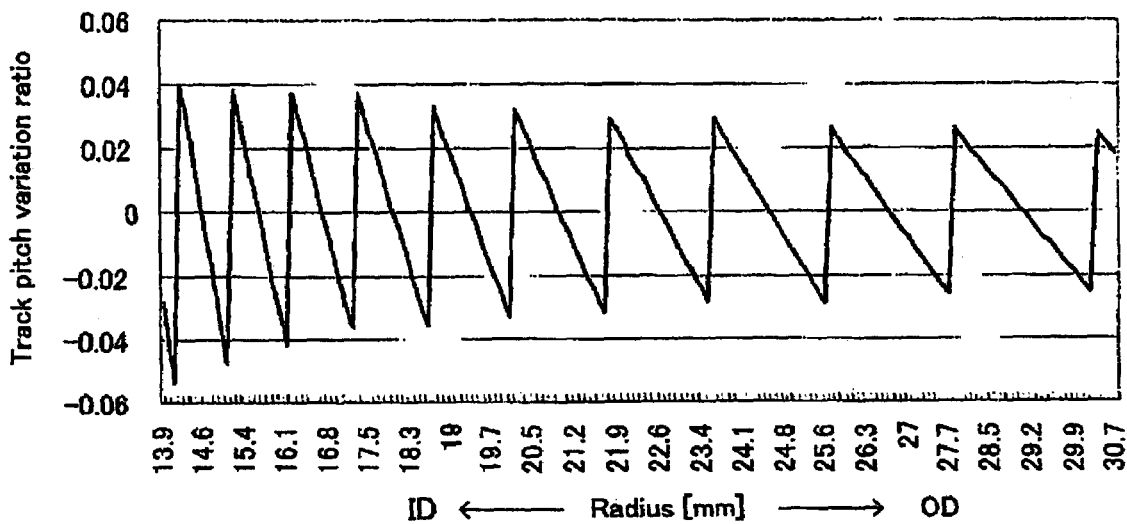
FIG. 10 is a graph showing a relationship between variation of a servo track pitch and the position in the radial direction of the magnetic disk in the hard disk drive according to the embodiment.

From Equation 7, the servo track pitch Pnew becomes maximum at C(Pn×n1−0.5) and becomes minimum at C(Pn×n1+0.5). Similarly, for all the numbers N, the variation ratio (Track Pitch variation ratio) when the standard servo track pitch Pn is varied is obtained. The relationship between the variation ratio and the position in the radial direction of the magnetic disk 3 is shown as FIG. 10. As shown in FIG. 10, the servo track pitch Pnew varies over the range of ID to OD of the magnetic disk 3 and is nonconstant. Moreover, FIG. 10 shows that the servo track pitch Pnew is the standard servo track pitch at the positions where the variation ratio is zero, and that the servo track pitch Pnew varies with the standard servo track pitch as a center. In addition, it can be seen that the variation ratio is inverted from plus to minus (or from minus to plus) at the boundary positions in the radial direction where the variation ratio is zero.

Figure 11:
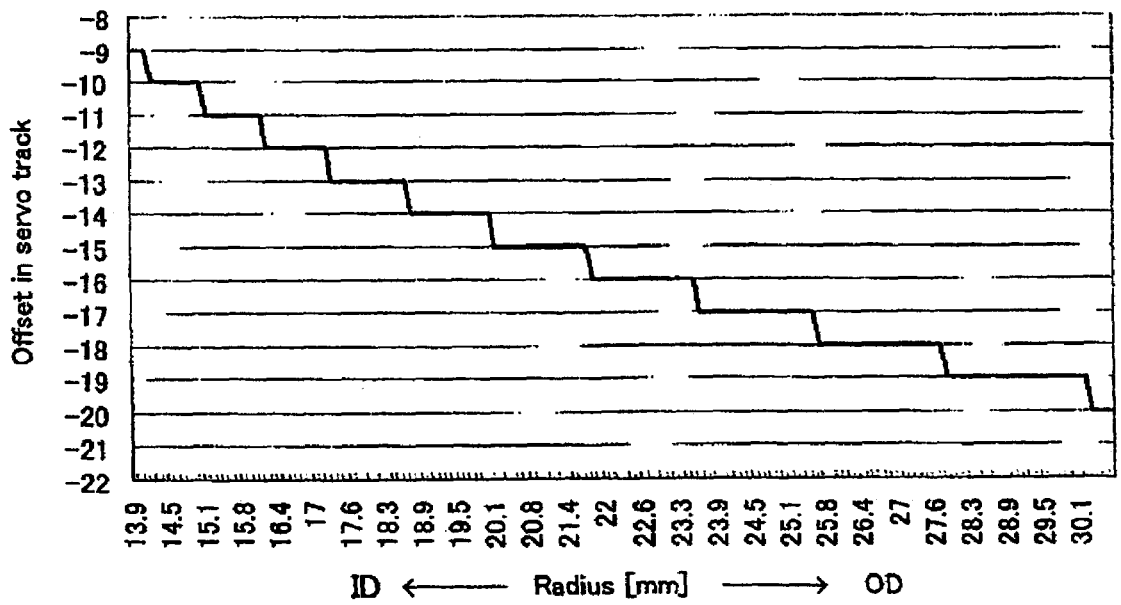
FIG. 11 is a graph showing a relationship between the position in the radial direction of the magnetic disk and the read write offset value in the hard disk drive according to the embodiment.

FIG. 11 shows the relationship between the position in the radial direction of the magnetic disk 3 and the read write offset value when the servo track pitch is varied as shown in FIG. 10. Note that the read write offset value is shown as the number of servo tracks (Offset in servo track). As shown in FIG. 11, if the servo track pitch is varied as shown in FIG.

10, then the read write offset value for each position in the radial direction of the magnetic disk 3 becomes a value equivalent to N servo tracks which are each varied, where N is an integer number. Note that, as shown in FIG. 11, the read write offset value represented as a value equivalent to N servo tracks is constant within a predetermined range in the radial direction. That is, the servo tracks are divided into zones, and the servo track pitch is set so that the read write offset value becomes a value equivalent to N servo tracks which exist in each zone. The integer number N varies depending on the zones and, in particular, increases from ID toward OD stepwise.

According to the hard disk drive 2 having the read write offset value as shown in FIG. 11, both the write and read heads W and R are positioned at positions where linearity of a PES is maintained. Such positions are preferable for position control by a servo as described above. The above-described advantage according to the embodiment will be described below based on FIG. 12.

Figure 12:
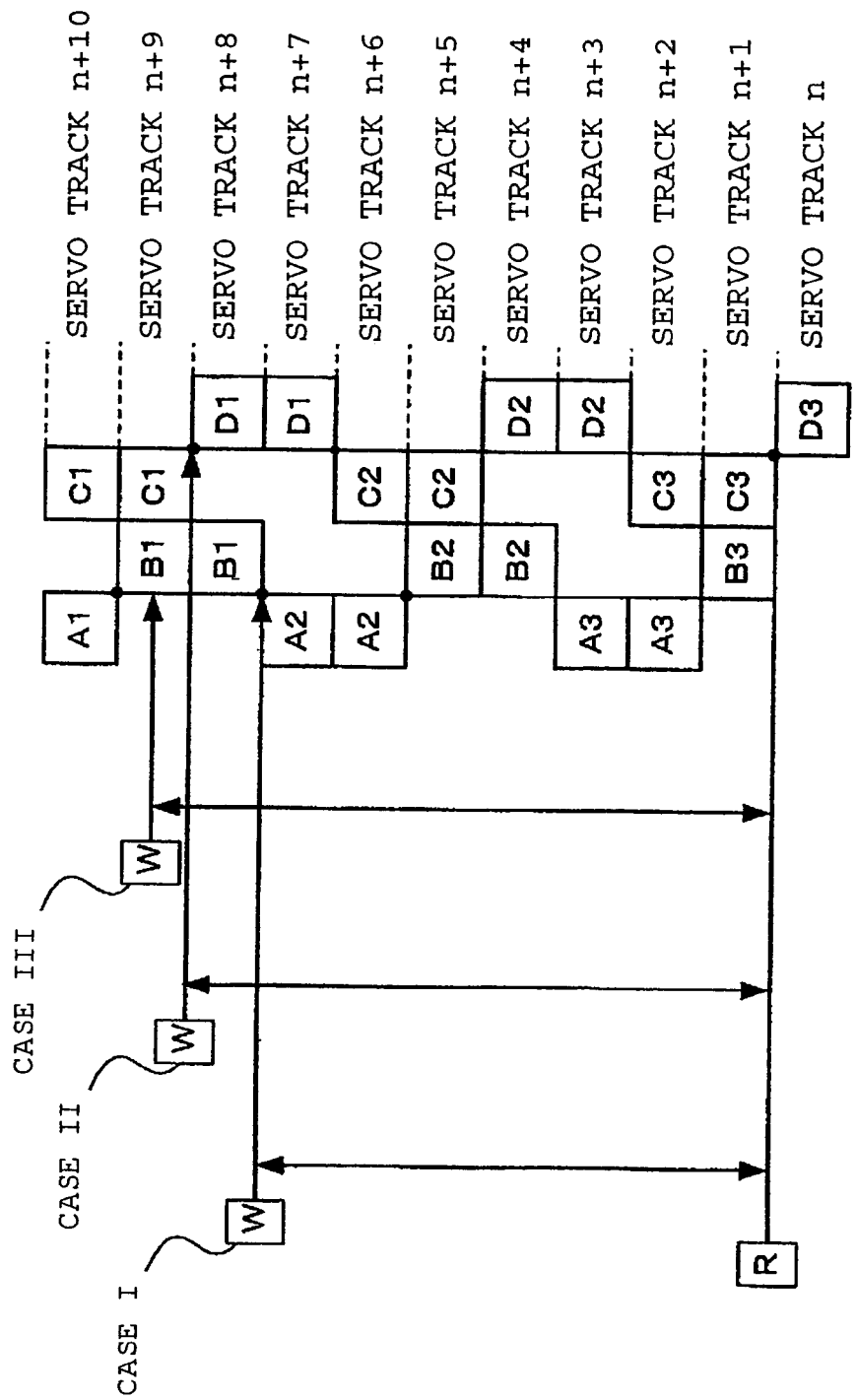
FIG. 12 is a view for explaining an advantage inherent in the hard disk drive according to the embodiment.

FIG. 12 is a view in which the read write offset values and the servo tracks are shown while being compared to each other. In FIG. 12, three cases where the read write offset values differ from each other are drawn. Note that the read head R is common to the three cases. Burst patterns such as A, B, and the like drawn in FIG. 12 are drawn assuming that the servo track pitch is constant for convenience.

Figure 13:
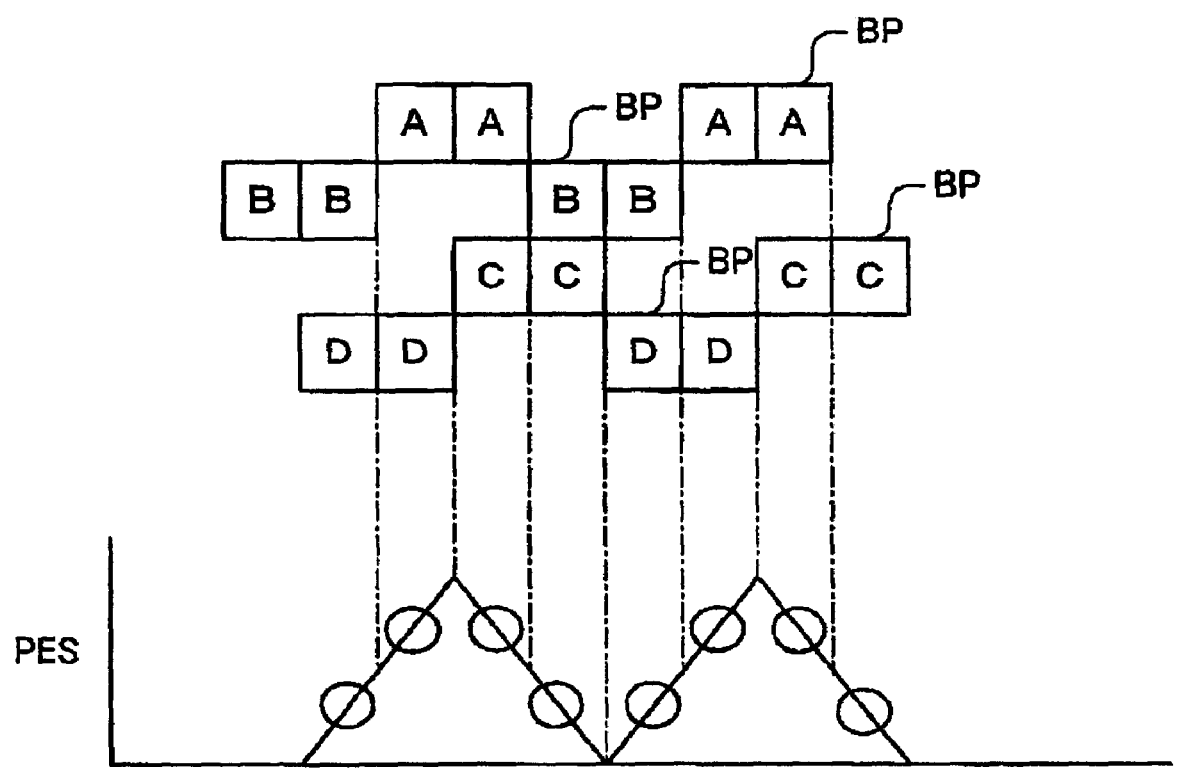
FIG. 13 is a view showing a relationship between burst patterns and a PES.

In FIG. 12, the cases I and II show the cases where the read write offset values are equivalent to N servo tracks. The case I shows the case of seven servo tracks and the case II shows the case of eight servo tracks. In the case I, the read head R is positioned on the boundary between the servo tracks C3 and D3, and the write head W is positioned on the boundary between the servo tracks B1 and A2. In the case II, the read head R is positioned on the boundary between the servo tracks C3 and D3, and the write head W is positioned on the boundary between the servo tracks C1 and D1. As can be seen from the foregoing description based on FIG. 13, in the cases I and II, both the read and write heads R and W are positioned at positions desirable for positioning control.

In contrast with the cases I and II described above, in the case III where the read write offset value is not equivalent to N servo tracks, the write head W is positioned within the servo track constituted by the servo patterns B1 and C1. Therefore, as can be seen from the description based on FIG. 13, the write head W is positioned at a position undesirable for positioning control.

As described above, in the hard disk drive 2 according to the embodiment, the read write offset value can be set to a value equivalent to N servo tracks by adjusting the servo track pitch. Accordingly, the read and write heads R and W can be positioned at positions desirable for servo control.

In the embodiment described above, the arrangement of the read and write heads R and W was described using the example of FIG. 5A, but the application of the present invention is not limited to this aspect. It is needless to say that the present invention can be applied to either a magnetic head slider 5 in which the centers of read and write heads R and W are aligned like FIG. 5B or a magnetic head slider 5 in which read and write heads R and W are parallelly located at a predetermined center distance from each other in the radial direction of the magnetic disk 3 as shown in FIG. 5C, for example. In the magnetic head slider 5 as shown in FIG. 5C, in which the read and write heads R and W are located parallelly, the read write offset value is larger, thus making the application of the present invention more effective.

When a write or read of user data is performed in the hard disk drive 2 according to the embodiment, operations of the magnetic head slider 5 can be controlled in a similar manner to that described in the background art. A table having read write offset values corresponding to relevant positions of a data track on the magnetic disk 3 prepared in advance, for example. When user data is written on the relevant data track and then read, the read head R is moved by an amount of the read write offset value obtained by referring to the table, thus making it possible to appropriately read the user data.

As described above, the present invention provides a data storage device in which read and write heads can be desirably located with respect to servo tracks from the viewpoint of linearity of a PES by setting a read write offset value to a value equivalent to N servo tracks.

Although the preferred embodiment of the present invention has been described in detail, it should be understood that various changes, substitutions and alternations can be made therein without departing from spirit and scope of the inventions as defined by the appended claims.

What is claimed is:

1. A data storage device comprising:
   a disk-shaped storage medium which has a data storage area and a servo area, the data storage area containing a plurality of data tracks which store user information, the servo area containing a plurality of servo tracks which store servo information for identifying positions of the plurality of data tracks;
   a head slider which supports write and read heads, the write head writing user data on the data tracks of the disk-shaped storage medium, the read head reading the user data written on the data tracks; and
   a rotary-type actuator which swings the head slider to position any one of the write and read heads at a target track of the disk-shaped storage medium, wherein a pitch of the plurality of servo tracks is varied in the radial direction of the disk-shaped storage medium, and a read write offset value is thereby set equivalent to an integer number N of the servo tracks, the read write offset value is set equivalent to an integer number N of the servo tracks, the read write offset value being a deviation amount between the write and read heads in a radial direction of the disk-shaped storage medium, the deviation amount being caused by swinging of the head slider by the rotary-type actuator.

2. The data storage device according to claim 1, wherein the plurality of servo tracks are divided into zones, and the read write offset value is equivalent to a constant number of servo tracks that exist in each zone.

3. The data storage device according to claim 1, wherein the integer number N varies with each predetermined number of the servo tracks.

4. A data storage device comprising:
   a disk-shaped storage medium that has a data storage area and a servo area, the data storage area containing a plurality of data tracks that store user information, the servo area containing a plurality of servo tracks that store servo information for identifying positions of the plurality of data tracks;
   a head slider that supports write and read heads, the write head writing user data on the data tracks of the disk-shaped storage medium, the read head reading the user data written on the data tracks; and
   a rotary-type actuator that swings the head slider to position any one of the write and read heads at a target track of the disk-shapes storage medium, wherein a read write offset value is set equivalent to an integer number N of the servo tracks, the read write offset value being a deviation amount between the write and read heads in a radial direction of the disk-shaped storage medium, the deviation amount being caused by swinging of the head slider by the rotary-type actuator, wherein the integer number N increases stepwise from an inner diameter toward an outer diameter of the disk-shaped storage medium.

5. A data storage device comprising:

a disk-shaped storage medium that has a data storage area and a servo area, the data storage area containing a plurality of data tracks that store user information, the servo area containing a plurality of servo tracks that store servo information for identifying positions of the plurality of data tracks;

a head slider that supports write and read heads, the write head writing user data on the data tracks of the disk-shaped storage medium, the read head reading the user data written on the data tracks; and a rotary-type actuator that swings the head slider to position any one of the write and read heads at a target track of the disk-shaped storage medium, wherein a read write offset value is set equivalent to an integer number N of the servo tracks, the read write offset value being a deviation amount between the write and read heads in a radial direction of the disk-shaped storage medium, the deviation amount being caused by swinging of the head slider by the rotary-type actuator, wherein the write and read heads are positioned within a region where an error signal obtained from the servo information is linear.

6. The data storage device according to claim 5, wherein the write and read heads are supported by the head slider while being located at a predetermined center distance from each other in the radial direction of the disk-shaped storage medium.

7. A servo information writing method for writing a burst pattern as servo information on a disk-shaped storage medium of a data storage device which has write and read heads, comprising the steps of:

calculating a read write offset value within a predetermined range on the disk-shaped storage medium, the read write offset value being a deviation amount between the write and read heads in a radial direction of the disk-shaped storage medium; and writing the burst pattern so that the measured read write offset value is equivalent to an integer number N of servo tracks formed by the burst pattern, wherein the burst pattern is written so that a pitch of the servo tracks varies at a predetermined variation ratio in the radial direction of the disk-shaped storage medium.

8. The servo information writing method according to claim 7, wherein writing the burst pattern so that the measured read write offset value is equivalent to the integer number N of servo tracks formed by the burst pattern further comprises dividing the servo tracks into zones so that the read write offset value is equivalent to a constant number of servo tracks that exist in each of the zones.

9. The servo information writing method defined in claim 7 wherein the integer number N increases stepwise for an inner diameter toward an outer diameter of the disk-shaped storage medium.

10. The servo information writing method defined in claim 7 wherein the write and read heads are positioned within a region where an error signal obtained from the servo information is linear.

11. The servo information writing method defined in claim 10 wherein the servo tracks are divided into zones, and the read write offset value is equivalent to a constant number of servo tracks that exist in each zone.

12. A servo information writing method for writing a burst pattern as servo information on a disk-shaped storage medium of a data storage device that has write and read heads, comprising the steps of:

calculating a read write offset value within a predetermined range on the disk-shaped storage medium, the read write offset value being a deviation amount between the write and read heads in a radial direction of the disk-shaped storage medium; and writing the burst pattern so that the measured read write offset value is equivalent to an integer number N of servo tracks formed by the burst pattern, wherein a pitch of the servo tracks is varied in relation to a predetermined pitch set as a standard.

13. The servo information writing method defined in claim 12 wherein the integer number N increases stepwise from an inner diameter toward an outer diameter of the disk-shaped storage medium.

14. The servo information writing method defined in claim 12 wherein the write and read heads are positioned within a region where an error signal obtained from the servo information is linear.

15. The servo information writing method defined in claim 12 wherein the servo tracks are divided into zones, and the read write offset value is equivalent to a constant number of servo tracks that exist in each zone.

* * * * *